(12) United States Patent
Huber et al.

(10) Patent No.: US 7,073,994 B2
(45) Date of Patent: Jul. 11, 2006

(54) CARGO DECK FOR AN AIRCRAFT

(75) Inventors: Thomas Huber, Schliersee (DE); Richard Holzner, Rosenheim (DE)

(73) Assignee: Telair International GmbH, Miesbach (DE)

( * ) Notice: Subject to any disclaimer, the term of this patent is extended or adjusted under 35 U.S.C. 154(b) by 91 days.

(21) Appl. No.: 10/837,819

(22) Filed: May 3, 2004

(65) Prior Publication Data

US 2004/0218989 A1    Nov. 4, 2004

(51) Int. Cl.
*B63B 25/00* (2006.01)
(52) U.S. Cl. ...................................................... 410/92
(58) Field of Classification Search .................. 410/92, 410/52; 244/137.1; 105/375
See application file for complete search history.

(56) References Cited

U.S. PATENT DOCUMENTS

| | | | |
|---|---|---|---|
| 2,625,118 A | | 1/1953 | Lechner ...................... 105/367 |
| 3,288,411 A | * | 11/1966 | Davidson ...................... 410/79 |
| 3,381,921 A | * | 5/1968 | McDonough et al. .......... 410/79 |
| 3,612,316 A | * | 10/1971 | Baldwin et al. ............. 414/499 |
| 3,693,919 A | | 9/1972 | Alberti et al. ........... 248/119 R |
| 3,709,450 A | * | 1/1973 | Watts et al. ................. 224/118 |
| 3,741,504 A | * | 6/1973 | Alberti et al. ............ 244/137.1 |
| 3,756,544 A | * | 9/1973 | Bader ...................... 244/137.1 |
| 3,874,538 A | * | 4/1975 | Kessler et al. .............. 414/507 |
| 3,899,092 A | * | 8/1975 | Nordstrom ..................... 410/87 |
| 4,395,172 A | * | 7/1983 | Hoener et al. ................ 410/84 |
| 4,929,133 A | * | 5/1990 | Wiseman ..................... 410/52 |
| 5,101,962 A | * | 4/1992 | Pritchard .................... 198/782 |
| 6,039,288 A | | 3/2000 | Huter et al. ............. 244/118.1 |
| 6,051,133 A | | 4/2000 | Huber et al. ................ 210/171 |
| 6,125,984 A | | 10/2000 | Huber et al. ........... 193/35 MD |
| 6,517,028 B1 | | 2/2003 | Huber ..................... 244/137.1 |

FOREIGN PATENT DOCUMENTS

| | | |
|---|---|---|
| DE | 21 62 042 | 7/1972 |
| DE | 197 12 278 A1 | 9/1998 |
| DE | 197 24 941 A1 | 12/1998 |
| EP | 464 981 A1 | 1/1992 |

OTHER PUBLICATIONS

Search Report in EP 04 01 0207 dated Aug. 18, 2004.

* cited by examiner

*Primary Examiner*—H Gutman
(74) *Attorney, Agent, or Firm*—Marshall, Gerstein & Borun LLP

(57) ABSTRACT

There are known cargo decks for aircraft that comprise floor beams or an equivalent floor substructure and floor panels, ball mats, roller tracks, or other such transport devices connected thereto for conveying and fixing in position pallets, containers or similar objects. In order to create a tight seal between a cargo space above the cargo deck and a bilge space below the cargo deck, sealing devices are provided, so that the floor panels, ball mats, roller tracks, etc. can be replaced at any time with no need to seal them off.

17 Claims, 4 Drawing Sheets

CARGO DECK FOR AN AIRCRAFT

FIELD OF THE INVENTION

The present invention relates to a cargo deck for an aircraft.

BACKGROUND OF THE INVENTION

A cargo deck for an aircraft is known, for example, from the patents DE-AS-21 62 042 and U.S. Pat. No. 3,693,919. The cargo deck comprises floor beams or an equivalent carrier construction, on which are provided floor panels or floor sections, ball mats, roller tracks, latches, roller drive units or other such transport devices for conveying and fixing in position pallets, containers or similar objects. That is, cargo decks of this kind simultaneously comprise both the transport means and the devices needed to lock the cargo into place, and hence constitute a complete transport system, along which the traffic flows steadily.

During the loading process, rainwater, snow or ice is likely to be brought into the cargo space along with the items of freight. To dispose of this water, the ball mats, roller tracks and sometimes also the roller drive units are provided with drainage devices, such as are known for instance from the patent DE 197 24 941 C2. When parts of the transport apparatus are being replaced, e.g., a ball mat with defective systems or the cargo deck must be reconstructed in order to store certain objects in a better way, considerable effort is required if the drainage devices likewise have to be rearranged.

Furthermore, the cargo-loading area must be an essentially tightly enclosed system so that if a fire should break out, the fire can be extinguished with halon. That is, the gas cannot be allowed to flow freely down into the bilge space, and this likewise necessitates considerable sealing work when transport devices are replaced or the cargo deck is reconstructed.

BRIEF SUMMARY OF THE INVENTION

It is thus an object of the invention to provide a cargo deck of the above-mentioned kind that facilitates the installation and replacement of transport devices.

According to the present invention there is provided a cargo deck for an aircraft, comprising a floor substructure such as floor beams; floor panels supported by the substructure; roller tracks disposed on the substructure; latches attached to the roller tracks; a plurality of ball mats disposed between the roller tracks; transport devices capable of running on the tracks for conveying objects over the cargo deck and being secured in position relative to the deck by the latches; and sealing devices to seal off a cargo space located above the cargo deck from a bilge space located below the cargo deck.

The cargo space may be separated from the bilge space with regard to hydraulic considerations, and that the associated separation apparatus can be made very lightweight in view of its mechanical stability. That is, what may be required is only a hydraulic separation, which need not be able to withstand any other kind of differential pressure.

The sealing devices are preferably constructed as collecting troughs, to collect water or similar liquids from the cargo space. Hence "two birds are killed with one stone", inasmuch as on the one hand a halon-tight seal is created, while on the other hand the same sealing device simultaneously serves to accumulate water or also other liquids that may run out of the transported containers.

The collecting troughs preferably comprise drains that are connected to a system of pipes to carry away the liquids. This measure makes it possible to collect the various liquids together and concentrate them in a single collecting basin or sump. Pumping devices can then be used to empty this container. In a preferred embodiment, the vacuum toilet system already present in the aircraft may be used as the pumping device, so that the collected liquid—either on demand or at regular intervals—can be sucked into the waste-water tanks provided there and emptied (along with the toilet water) when the aircraft is on the ground.

The collecting troughs are preferably attached to the floor beams and/or the roller tracks. Because the floor beams together with the roller tracks are arranged in a uniform array, it is possible to work with only a few different shapes or sizes, which makes both manufacture and installation of the collecting troughs considerably easier.

The installation becomes particularly simple when the collecting troughs are attached to the floor beams and/or the roller tracks by adhesive, e.g., with adhesive tape that is sticky on both sides. Given that the collecting troughs are appropriately shaped, namely so that the weight of the troughs is supported by a form-fitted seating, this method of fixation is entirely adequate and particularly simple as well as economical.

The roller tracks may be provided with separate drains. However, it may be preferable to equip the roller tracks with drainage bores, in particular disposed in their side walls so that the drainage bores open into the adjacent collecting troughs. Hence the roller tracks themselves amount to "collecting troughs", but with no need for the provision of separate drains.

Preferably, the drains are provided with filter devices, so that the drainage-pipe system cannot become clogged. The filter devices can easily be cleaned from above by suction when the overlying transport devices, in particular the ball mats and ball strips, are lifted away.

The ball mats or other structural elements that cover a broad area, such as floor panels, are preferably provided with drainage openings on their upper and lower surfaces. When separate drainage devices are provided, it suffices to construct the ball mats so that their lower surfaces comprise drainage openings (or are substantially entirely open), so that water that enters through the ball elements, or through the bores provided to receive the ball elements, can run freely downward into the collecting troughs.

The roller drive units are preferably disposed in corresponding installation openings and indentations in the ball mats, as is known for instance from the patent DE 197 12 278 A1. These ball mats (and, where applicable, also the ball strips) are preferably attached by means of quick-acting closures, in particular to the roller tracks.

An embodiment of the invention will now be described by way of example with reference to the accompanying drawings.

DETAILED DESCRIPTION OF THE INVENTION

Figure 1:
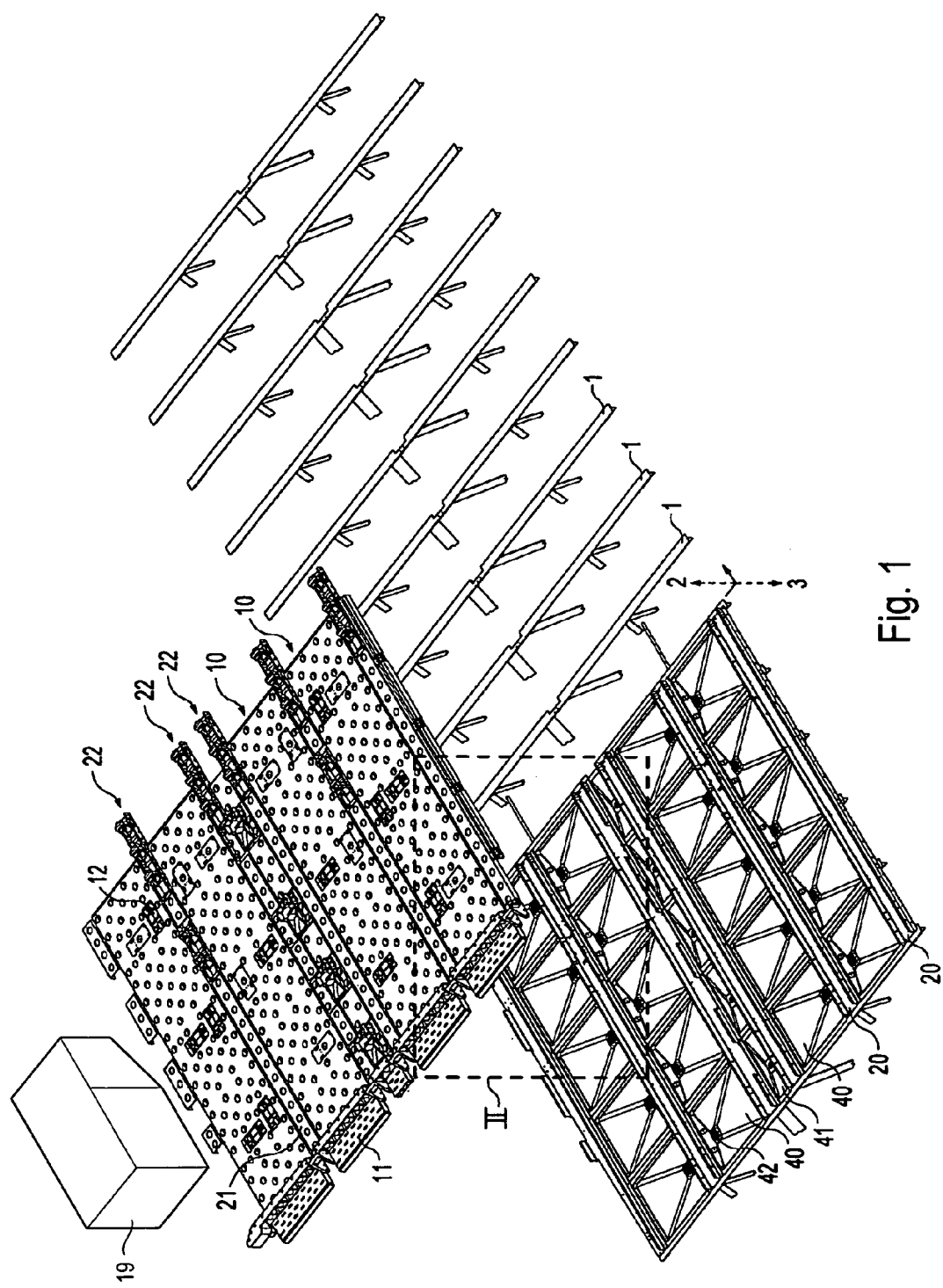
FIG. 1 is a schematic perspective view, seen from above, of a partially installed cargo deck.

In the following description, the same reference numerals are used for identical parts or parts with identical actions.

As can be seen in FIG. 1, a cargo deck comprises floor beams 1 as its substructure, on which are disposed roller tracks 20 that run in the long direction of the cargo space, for conveying and fixing in position one or more objects, such as, for example, a container 19. Into the almost square openings that result from this arrangement are inserted (large) troughs 40, whereas (small) troughs 41 are inserted into the more elongated openings. All these troughs are fixed at their edges to the floor beams 1 or to the outwardly extending parts of the roller tracks 20 by means of double-sided adhesive tape. Transport devices, such as, for example, ball strips 21 or latches 22 are installed in the roller tracks 20. Between the roller tracks 20 are mounted floor panels that may be in the form of ball mats 10, which comprise openings into which can be inserted roller drive units 12 or additional latches.

Figure 2:
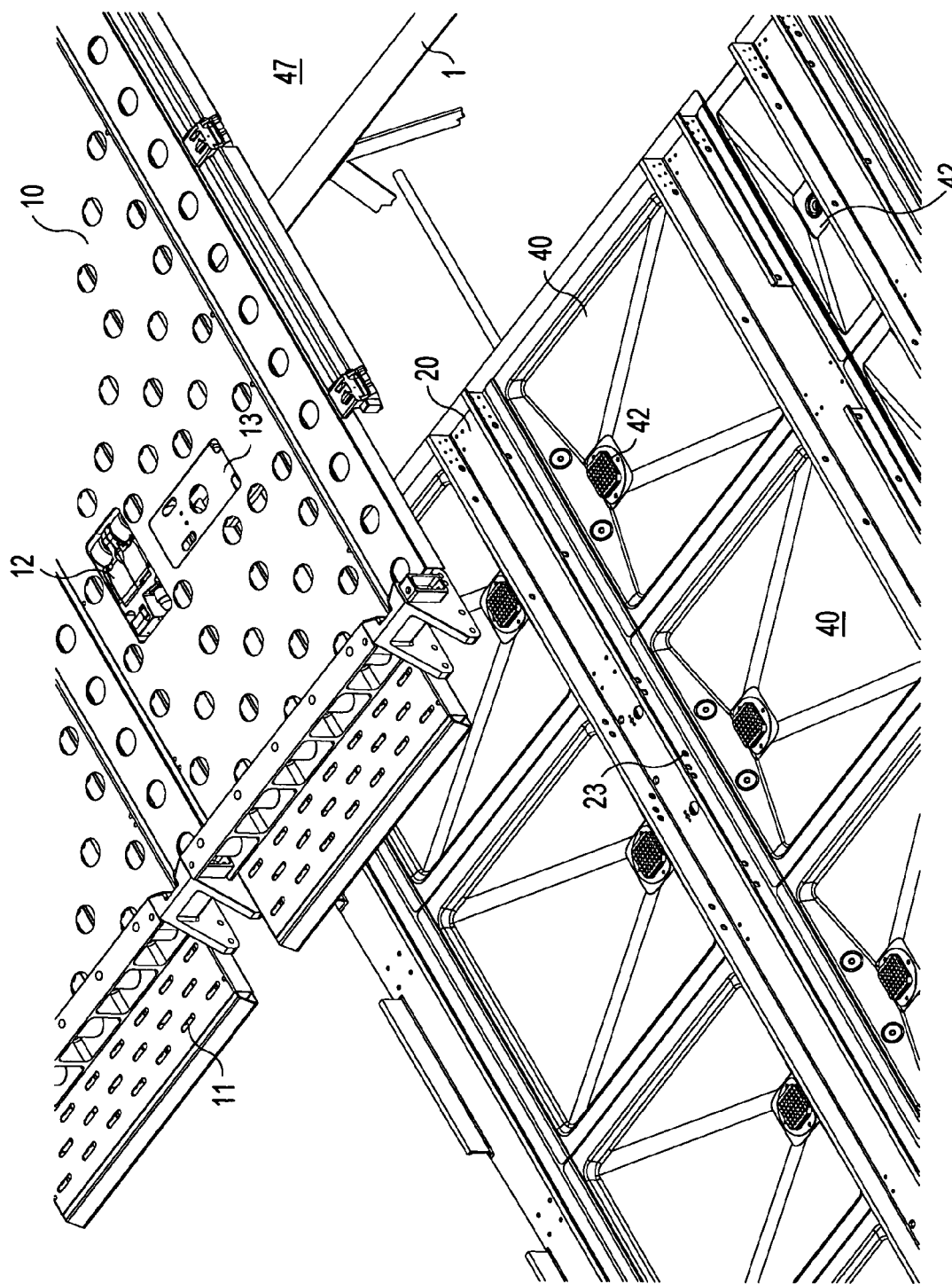
FIG. 2 is a view to an enlarged scale of Region II in FIG. 1.

The troughs 40, 41 may comprise, as shown in particular in FIG. 2, drains 42 that are provided with filter devices (shown here as gratings). The troughs 40, 41 may be shaped such that the drains 42 in each case are situated at the lowest point in the associated trough 40, 41. Passageways 47 may be provided for cables supplying control signals and power, e.g., for the roller drive units 12; these openings can be sealed, e.g., by rubber plugs, so as to enable simple servicing of the roller drive units 12 or of sensor elements with electrical leads.

Figure 3:
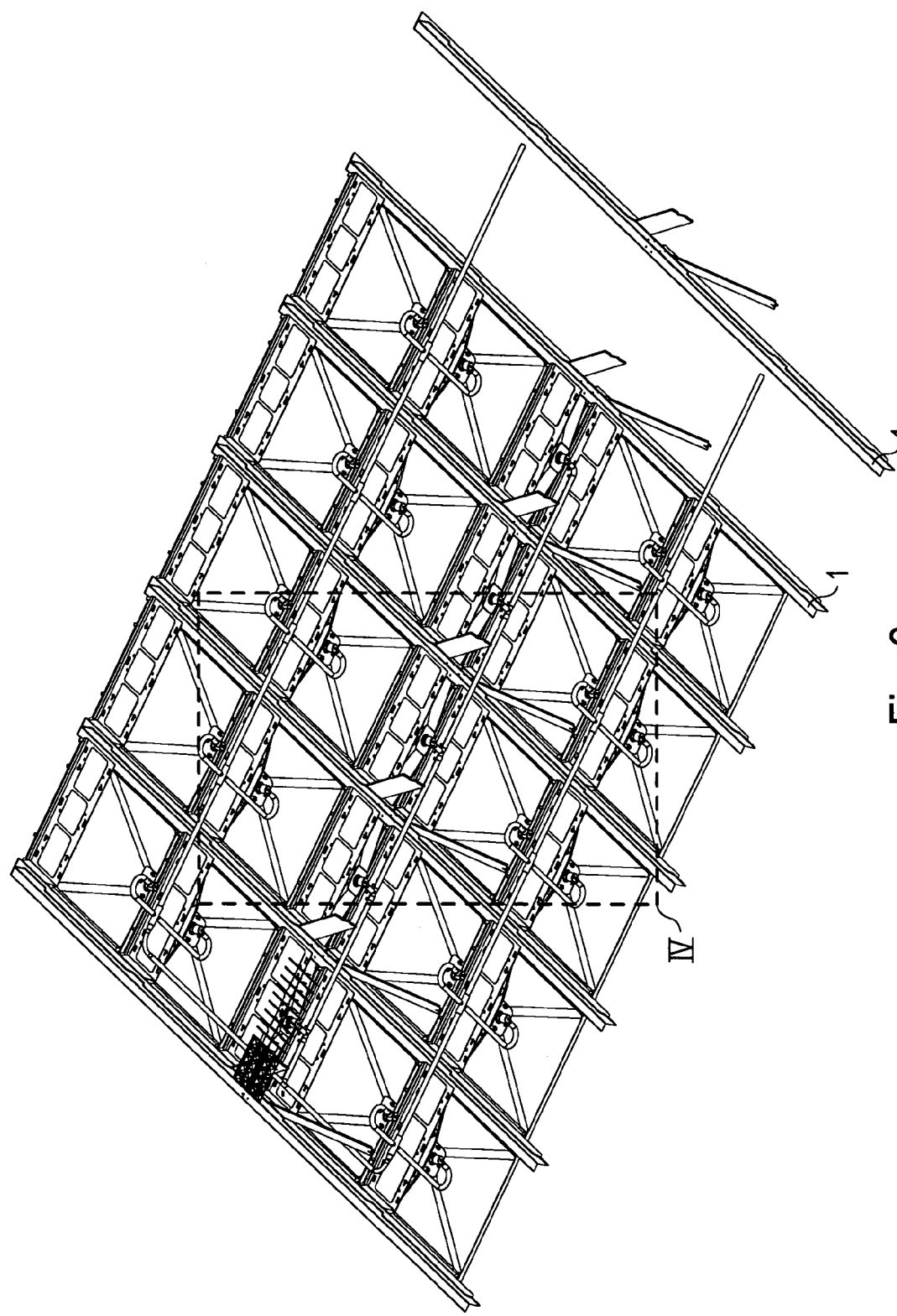
FIG. 3 is a perspective view of part of the cargo deck, seen from below.
Figure 4:
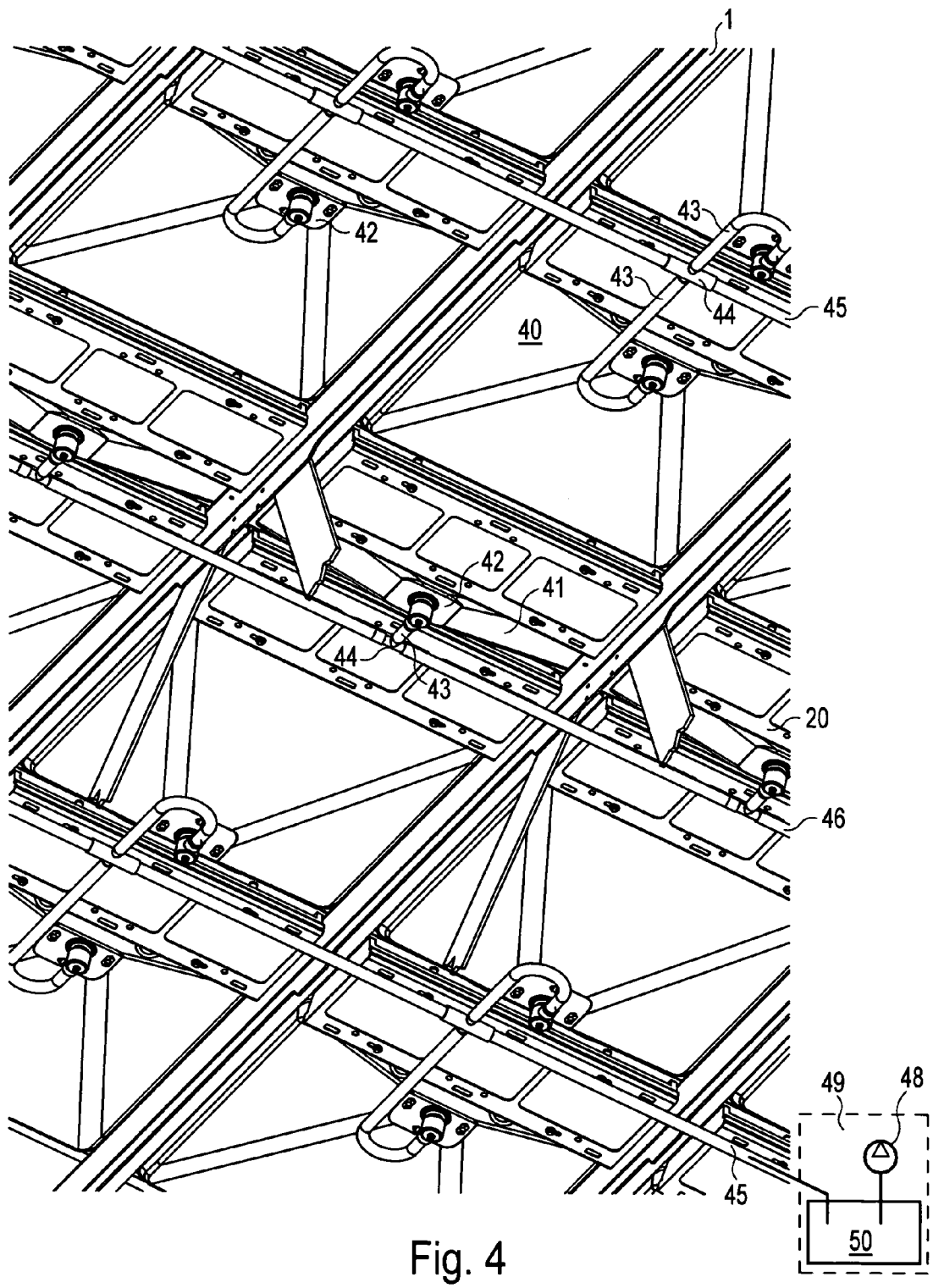
FIG. 4 is a view to an enlarged scale of Region IV in FIG. 3.

As can be seen in FIGS. 3 and 4, showing the view from below, the drains 42 in the troughs 40, 41 may be connected by way of connector pipes 43 and coupling pieces 44 to collection pipes 45, 46 through which the water that enters can be passed to collection basins or into the external surroundings. When the troughs 40, 41 are constructed appropriately, so that they fit precisely into place and are tightly joined to the floor beams 1 and the roller tracks 20, the space 2 is thus sealed off from the bilge space 3 (see FIG. 1) with a residual leakage that depends on the cross section of the collection pipes 45, 46. If these empty into a single collection pipe, therefore, the leakage is proportional to the cross section of this single collection pipe, which furthermore can be easily shut off by a valve (not shown) in order to bring about an absolutely impenetrable separation between the cargo space 2 and the bilge space 3. In the embodiment shown (see FIG. 4), the pipes 45, 46 are connected to a vacuum toilet system 49 with a pump 48 that is available in the aircraft, so that liquid, as needed or at regular intervals, can be sucked into this collection basin 50 and emptied after the flight, on the ground.

The roller tracks 20 may be drained by way of drainage openings 23 that open into troughs 40. The ball mats 10 additionally comprise drainage openings 11, and are likewise open on their underside as well as in the region of the roller drive units 12 or the associated installation openings 13; as a result, the surface lying on the sealed-off system comprising floor beams 1, roller tracks 20 and troughs 40, 41 can be penetrated by liquid, so that no puddles can accumulate there during operation.

When the ball mats 10 or ball strips 21 are being replaced, therefore, it is never necessary to worry about whether the sealing is adequate, which greatly facilitates assembly and disassembly. Preferably the ball mats 10 and the ball strips 21 can be easily installed and removed, in particular on the roller tracks 20, by way of quick-acting closures (not shown).

The invention claimed is:

1. A cargo deck for an aircraft, comprising
   a floor substructure;
   floor panels supported by the substructure;
   roller tracks disposed on the substructure;
   one or more transport devices capable of running on the roller tracks for conveying objects over the cargo deck; and
   one or more sealing devices to seal off a cargo space located above the cargo deck from a bilge space located below the cargo deck, wherein the troughs include drains that are connected to a system of pipes to carry the liquid away;
   wherein the sealing devices comprise troughs for the collection of liquid from the cargo space; and
   wherein the troughs include drains that are connected to a system of pipes to carry the liquid away.

2. A cargo deck as claimed in claim 1, wherein the troughs are attached to at least one of the floor substructure and the roller tracks.

3. A cargo deck as claimed in claim 1, wherein the roller tracks define drainage openings that provide a passage into the troughs.

4. A cargo deck as claimed in claim 1, wherein the drains include filter devices.

5. A cargo deck as claimed in claim 1, wherein the drains are connected to at least one of a pump and a vacuum device.

6. A cargo deck as claimed in claim 5, wherein the vacuum device comprises a vacuum toilet system that is present in the aircraft.

7. A cargo deck as claimed in claim 1, wherein the transport devices include at least one latch.

8. A cargo deck as claimed in claim 1, wherein the transport devices include at least one roller drive unit.

9. A cargo deck as claimed in claim 1, wherein the floor panels include at least one ball mat.

10. A cargo deck as claimed in claim 1, wherein the floor substructure includes at least one floor beam.

11. A cargo deck for an aircraft, comprising
    a floor substructure;
    a plurality of roller tracks disposed on the substructure;
    a plurality of ball mats disposed between the roller tracks;
    one or more transport devices capable of running on the roller tracks for conveying objects over the cargo deck; and
    one or more sealing devices to seal off a cargo space located above the cargo deck from a bilge space located below the cargo deck;
    wherein the ball mats define drainage openings on at least one of the lower and upper surfaces thereof.

12. A cargo deck as claimed in claim 11, wherein the transport devices include at least one latch.

13. A cargo deck as claimed in claim 11, wherein the transport devices include at least one roller drive unit.

14. A cargo deck for an aircraft, comprising
    a floor substructure including a plurality of floor beams;
    floor panels supported by the substructure;
    a plurality of roller tracks disposed on the substructure;
    a plurality of transport devices capable of running on the roller tracks for conveying objects over the cargo deck and being secured in position relative to the deck by the latches; and one or more sealing devices to seal off a cargo space located above the cargo deck from a bilge space located below the cargo deck;

wherein the sealing devices include at least one trough for the collection of liquid from the cargo space, and wherein each trough is attached to and mounted between at least one of two of the floor beams and two of the roller tracks.

15. A cargo deck as claimed in claim 14, wherein the transport devices include at least one latch.

16. A cargo deck as claimed in claim 14, wherein the transport devices include at least one roller drive unit.

17. A cargo deck as claimed in claim 14, wherein the floor panels include at least one ball mat.

* * * * *